United States Patent

Faerber et al.

[11] Patent Number: 5,933,788
[45] Date of Patent: Aug. 3, 1999

[54] RADIO STATION FOR TRANSMITTING AND RECEIVING DIGITAL INFORMATION IN A MOBILE COMMUNICATIONS SYSTEM

[75] Inventors: Michael Faerber, Wolfratshausen; Helmut Muehlbauer, Lochham; Franz-Peter Wangerczyn, Hoehenk.-Siegertsbrunn, all of Germany

[73] Assignee: Siemens Aktiengesellschaft, Munich, Germany

[21] Appl. No.: 08/840,423

[22] Filed: Apr. 29, 1997

[30] Foreign Application Priority Data

Apr. 29, 1996 [DE] Germany .......................... 196 17 140

[51] Int. Cl.⁶ .................................................. H04B 1/40
[52] U.S. Cl. ............................ 455/562; 455/561; 455/73; 342/361; 343/797
[58] Field of Search .................................. 455/561, 562, 455/277.1, 277.2, 73, 271, 275; 343/853, 893, 850, 857, 797; 342/360, 361

[56] References Cited

U.S. PATENT DOCUMENTS

| | | | |
|---|---|---|---|
| 4,694,484 | 9/1987 | Atkinson et al. | 379/59 |
| 4,700,196 | 10/1987 | Campbell et al. | 343/797 |
| 4,704,733 | 11/1987 | Kawano | 455/16 |
| 5,262,788 | 11/1993 | Drabowitch | 342/188 |
| 5,432,780 | 7/1995 | Smith et al. | 370/37 |
| 5,550,813 | 8/1996 | Vella-Coleiro | 370/24 |
| 5,576,717 | 11/1996 | Searle et al. | 342/373 |
| 5,581,260 | 12/1996 | Newman | 342/374 |
| 5,724,666 | 3/1998 | Dent | 455/562 |

FOREIGN PATENT DOCUMENTS

| | | |
|---|---|---|
| 0725 498 A1 | 8/1996 | European Pat. Off. . |
| 20 32 002 B2 | 6/1981 | Germany . |
| 37 89 710 T2 | 8/1988 | Germany . |

OTHER PUBLICATIONS

Siemens Function Specification issued by Mobile Radio Networks, Siemens AG, 1995, 3 pages.

Wiesner, Lothar: "Fernschreib und Datenübertragung über Kurzwelle," Siemens AG, 1980, pp. 93–105.

*Primary Examiner*—Reinhard J. Eisenzopf
*Assistant Examiner*—Duc Nguyen
*Attorney, Agent, or Firm*—Hill & Simpson

[57] ABSTRACT

A radio station for transmitting and receiving digital information in a mobile communications system is provided having transmission and diversity reception implemented via a single antenna. For this purpose, the antenna has at least two exciter systems with different polarization. The transmitting and receiving units are connected to the exciter systems in a suitable manner, for example, via duplexers.

13 Claims, 4 Drawing Sheets

RADIO STATION FOR TRANSMITTING AND RECEIVING DIGITAL INFORMATION IN A MOBILE COMMUNICATIONS SYSTEM

BACKGROUND OF THE INVENTION

The present invention generally relates to a radio station for transmitting and receiving digital information in a mobile communications system. More specifically, the present invention relates to a radio station for transmitting and receiving information having an antenna, at least one transmitting unit and at least one receiving unit.

Radio stations are used for transmitting information with the aid of electromagnetic waves. The frequency spectrum of the electromagnetic waves in question extends from a few kHz up to several hundred GHz. The frequency spectrum in the lower gigahertz range has gained importance as a result of the development of mobile radio technology. Radio stations at about 0.9 and 1.8 GHz are thus used for mobile radio technology. One example of a mobile communications system is the GSM mobile radio network (Global System for Mobile Communications), although such a mobile communications system is also implemented by known wire-free communications networks, for example in accordance with the DECT standard.

Where these radio stations are intended both for transmitting and receiving information, they have at least one receiving unit and at least one transmitting unit. The information to be transmitted is modulated in the transmitting unit onto a carrier frequency, and the transmitted signals generated are amplified. The receiving unit is used to evaluate the information in the received signals and to separate them from the carrier and from noise interference.

Such a radio station has been disclosed, for example, as a base station in German Patent Application 195 472 88.8. This radio station furthermore has an antenna for transmitting and receiving. Thus, not only are the transmitted signals transmitted, but the received signals are also received via this antenna. However, this radio station has the disadvantage that diversity reception is impossible.

Various options for implementing diversity reception have been disclosed in the document entitled "Short-Wave Telex and Data Transmission," L. Wiesner, Siemens AG, Third edition, 1980, pp. 94–104. The possibility of polarization diversity is proposed, inter alia, in which two antennas are used for diversity reception, one of which is polarized, for example, vertically and the other horizontally. Such an antenna system has also been disclosed in German Patent Specification DE 2 032 002 B2. These documents propose implementations for diversity reception which, however, are based on physically separated antennas and, in addition, do not take account of the problems of transmitting operation.

Conventional mobile communications systems, such as Siemens Function Specification, A30862-X1001-A314-03-7659, MOBNET, dated Aug. 25, 1995, page 5–2, also implement a radio station with diversity operation by having separate antennas for transmitting and for each individual diversity path. The two antennas for diversity reception must be physically separated to a certain extent, however, to ensure that the received signals are decorrelated. Another implementation option provides for duplexing of transmitted signals at the antennas for diversity reception. However, once again, the antennas must be physically separated for diversity reception here.

However, with regard to present-day mobile communications systems, there is considerable pressure on the network operators to manage with a small number of antenna sites. In this case, the provision of two separate antennas for diversity reception represents a considerable disadvantage.

SUMMARY OF THE INVENTION

The present invention provides a radio station for transmitting and receiving digital information in a mobile communications system. The radio station requires a small amount of space for the antenna site for transmission and for diversity reception.

To this end, in an embodiment of the present invention, the antenna has a first and a second exciter system with different polarization. To use the antenna both for transmitting and receiving, a first duplexer connects at least one first transmitting unit and one first receiving unit to a common first antenna cable. The first exciter system is connected to the first duplexer via the first antenna cable. The second exciter system is connected to at least the first receiving unit via a second antenna cable. Diversity reception is thus ensured at least via the first receiving unit and the two exciter systems. Furthermore, digital information is transmitted at least via the first exciter system.

Alternatively, at least three exciter systems, two for receiving and one for transmitting, are provided in the antenna. The exciter systems are distinguished by their polarization planes. This solution allows the duplexer to be dispensed with, but results in increased complexity in the implementation of the antenna.

The radio station according to the invention at the same time satisfies, in an advantageous manner, the need to reduce the number of antennas and the requirements for a mobile communications system with diversity reception. It is thus possible for network operators to satisfy stringent requirements, for example, with regard to visual and aesthetic effects of the antenna system, particularly in population centers.

In another embodiment of the present invention, the first and the second exciter system have a common geometric center point. Such an arrangement of the exciter systems allows the space requirement for the antenna to be further reduced. Element groups are advantageously used for the exciter system for high antenna gain. Appropriate arrangements of the elements of the exciter systems allow the production of polar diagrams of different polarization to be implemented without any major additional complexity.

In this case, it is also possible to integrate other exciter systems in this antenna. These additional exciter systems are used either for diversity reception or for transmission in an embodiment of the radio station according to the invention.

If it is intended to emit transmitted signals not just via one exciter system above, then a further embodiment of the radio station according to the invention provides for the second exciter system to be connected to the first receiving unit via a second duplexer. The second duplexer connects a second transmitting unit and the first receiving unit to the common second antenna cable. The transmitted energy from one transmitting unit can thus be distributed between two exciter systems, or different transmitting units can each be connected to one exciter system based on different implementation options.

If a plurality of receiving units are used in the radio station, then it is advantageous to connect each of them to a first and a second isolating amplifier (if there are two exciter systems), and to use the isolating amplifiers to distribute the power of the received signals, which are received by the two exciter systems, appropriately to the receiving units. The use of isolating amplifiers allows a greater number of receiving units to be used.

According to a further embodiment of the radio station according to the invention, and, in particular, of the antenna, the exciter systems are arranged in such a manner that the cross-polarization decoupling of the exciter systems is at least 30 dB. This decoupling corresponds to the decoupling between two antennas, one meter apart, at 900 MHZ. This measure is intended to ensure that the interactions between the transmitting and receiving exciter systems are low. A high level of cross-polarization decoupling is archived, for example, by the polarization plane of the first and of the second exciter system being inclined at about 90 degrees with respect to one another. The inclination of the polarization planes of the two exciter systems with respect to the horizontal can be defined in various ways. It is particularly advantageous to incline both polarization planes at about 45 degrees with respect to the horizontal in order that they are made uniform at the receiving radio station after various reflections on the radio path or else by the direct propagation path. A further embodiment provides that the polarization plane of an exciter system which emits the transmitted signals is approximately at right angles with respect to the horizontal. This inclination corresponds to the previously normal arrangements of transmitting antennas.

Power combiners are advantageously used to connect a large number of transmitting units. Each of the power combiners connects a plurality of transmitting units to one duplexer or directly to an exciter system. If it is intended to use a plurality of transmitting units and to keep the transmission losses of the transmitted energy in the transmitted signals to the exciter systems low, then, according to an embodiment of the present invention, power combiners are dispensed with by adding a further antenna whose exciter systems are used for transmitting or else for improving the diversity reception.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
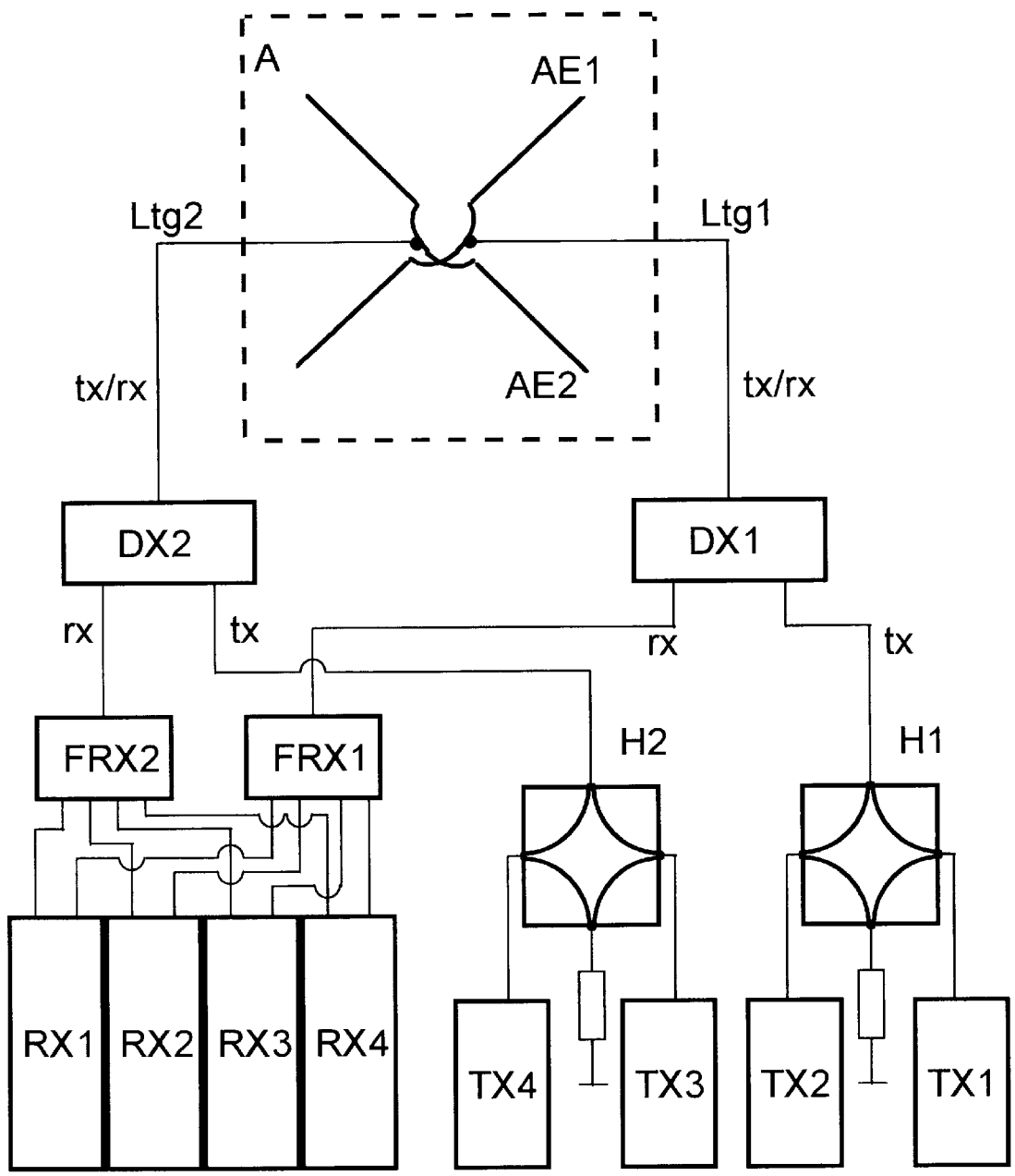
FIG. 1 illustrates a radio station having two exciter systems which are both inclined at 45 degrees with respect to the horizontal and having in each case four transmitting and receiving units.

A radio station FS as shown in FIG. 1 has an antenna A, four receiving units RX1, RX2, RX3 and RX4 and four transmitting units TX1, TX2, TX3 and TX4. The transmitted signals tx from the first and the second transmitting units TX1, TX2 are combined by a first power combiner H1 and are supplied to a first duplexer DX1. The transmitted signals tx from the third and from the fourth transmitting units TX3, TX4 are combined in a corresponding manner by a second power combiner H2 and are supplied to a second duplexer DX2. The power combiners H1, H2 result in the transmitted energy being transmitted with suitable matching to the duplexers DX1, DX2.

Each of these duplexers DX1, DX2 is connected to a first isolating amplifier FRX1 or to a second isolating amplifier FRX2, respectively. Broadband filtering is carried out in the isolating amplifier FRX1, FRX2 based on the system bandwidth, and amplification is once again carried out before the energy in the received signals rx is distributed uniformly to all of the receiving units RX1, RX2, RX3 and RX4. A diversity method is used to evaluate the received signals rx in the receiving units RX1, RX2, RX3 and RX4. With regard to known diversity reception methods, reference should be made, for example, to J. G. Proakis, "Digital Communications", McGraw Hill, 1989, the disclosure of which is incorporated herein by reference in its entirety.

The first and the second duplexer DX1, DX2 connects the transmitting units TX1, TX2, TX3 and TX4 and receiving units RX1, RX2, RX3 and RX4 to a first and a second antenna cable Ltg1, Ltg2, respectively. These antenna cables Ltg1, Ltg2 lead to the antenna A. The antenna A has two exciter systems AE1, AE2. The first exciter system AE1 is connected to the first antenna cable Ltg1, and the second exciter system AE2 is connected to the second antenna cable Ltg2. The two exciter systems AE1, AE2 are inclined at about 45 degrees with respect to the earth's horizontal and at about 90 degrees with respect to one another. The polarization planes of their emission directions are also inclined in a corresponding manner. The exciter systems AE1,AE2 are, for example, antenna arrays, each of which has a plurality of individual elements.

Figure 2:
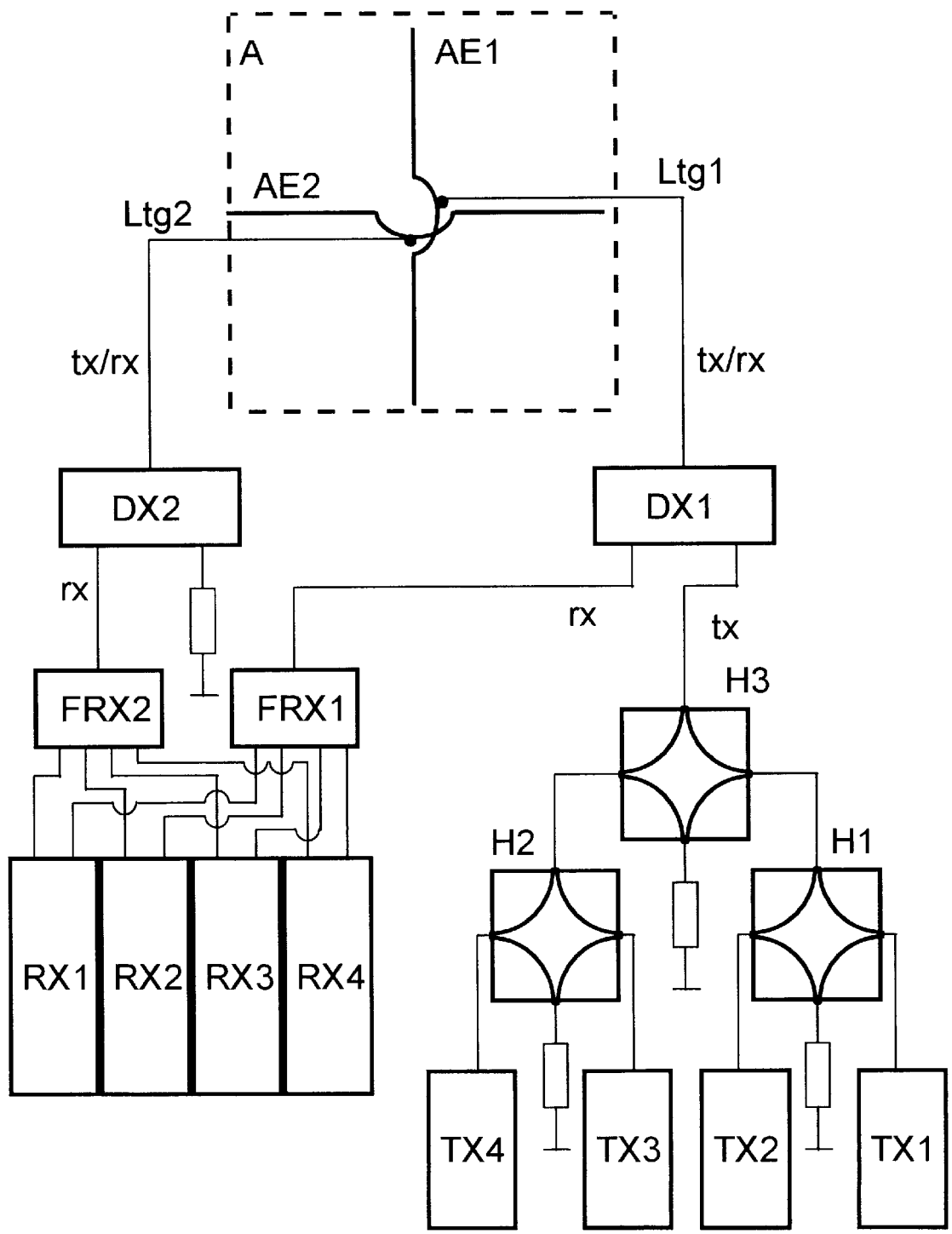
FIG. 2 illustrates a radio station having two exciter systems which are inclined at 90 degrees with respect to one another and having a vertical polarization plane for the transmitted signals which are emitted.

The radio station FS according to FIG. 2 once again has an antenna A, four transmitting units TX1, TX2, TX3 and TX4 and four receiving units RX1, RX2, RX3 and RX4. However, in contrast to the radio station FS according to FIG. 1, the transmitted energies in the transmitted signals tx of the four transmitting units TX1, TX2, TX3 and TX4 are combined in a different way. After the transmitted signals tx from the first and the second transmitting units TX1, TX2 have been combined in a first power combiner H1, and the transmitted signals tx from the third and the fourth transmitting units TX3, TX4 have been combined in a second power combiner H2, these transmitted signals tx are once again combined in a third power combiner H3 and are supplied only to the first duplexer DX1. The second duplexer DX2 is terminated with appropriate matching at the transmitting unit end. The receiving units RX1, RX2, RX3 and RX4 are connected in accordance with the arrangement of the receiving units RX1, RX2, RX3 and RX4 according to FIG. 1.

The first and the second exciter systems AE1, AE2 of the antenna A are once again connected via the first and the second antenna cables Ltg1, Ltg2 to the first and second duplexers DX1, DX2. The first exciter system AE1 is arranged at right angles with respect to the horizontal and is inclined at about 90° to the second exciter system AE2. The transmission polar diagram of the transmitted signals tx is thus vertically polarized. As in FIG. 1 as well, the received signals rx are received in both polarization planes. This arrangement of the exciter systems AE1, AE2 produces polarization diversity reception in the same way as for the radio station FS according to FIG. 1.

Figure 3:
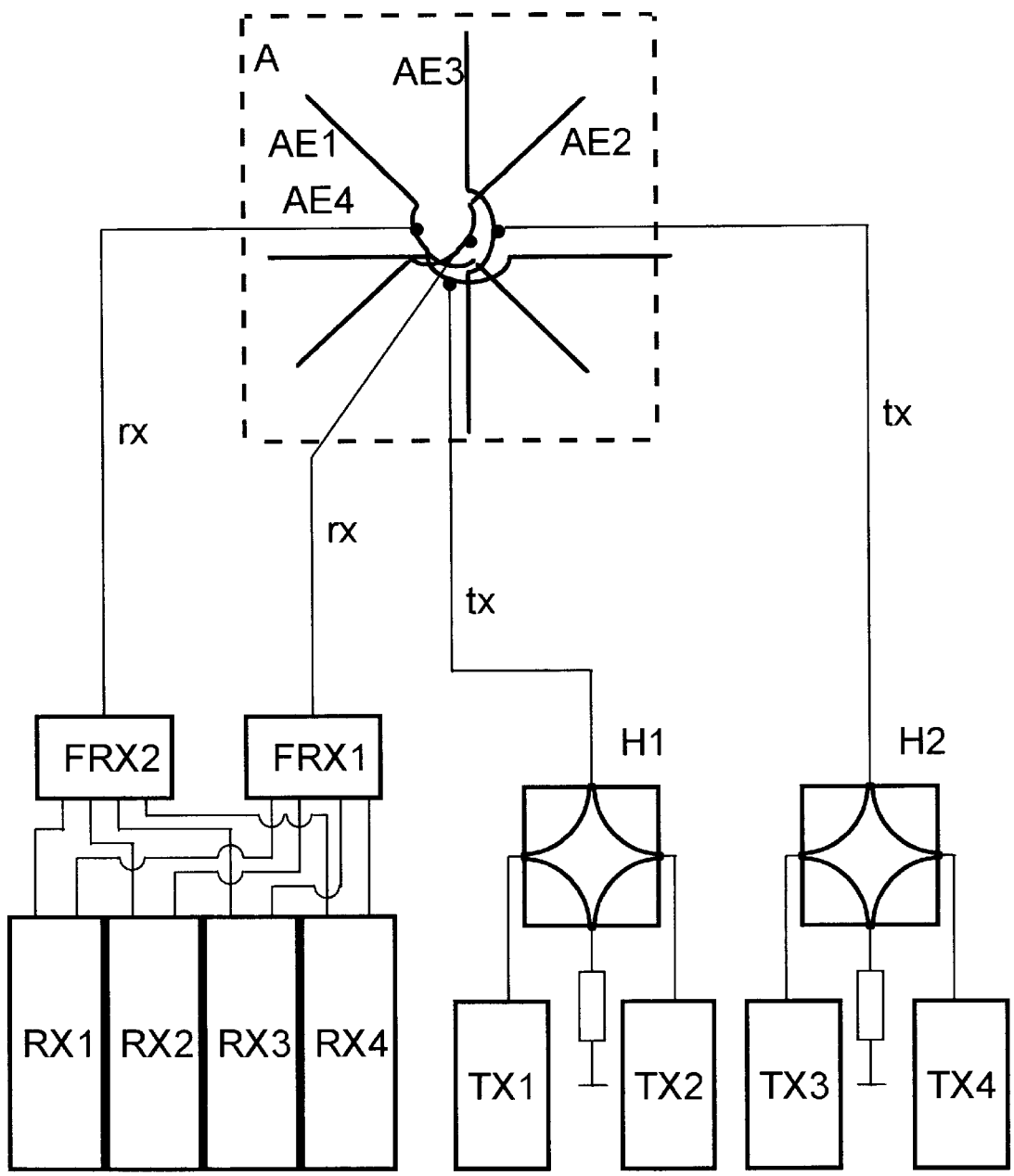
FIG. 3 illustrates a radio station with an antenna having four exciter systems.

The radio station FS according to FIG. 3 shows a further implementation option. The antenna A has four exciter systems AE1, AE2, AE3 and AE4. These are, for example, each inclined at 45 degrees with respect to one another, but a different number of exciter systems with different inclination may be used. A first exciter system AE1 is connected to a first isolating amplifier FRX1, and the second exciter system AE2 is connected to the second isolating amplifier FRX2. The two isolating amplifiers FRX1, FRX2 are respectively connected to the first and the second receiving units RX1, RX2 and supply to the two receiving units RX1,RX2, the received signals rx received by the first and the second exciter systems AE1, AE2. The first and the second transmitting units TX1, TX2 are directly connected to third and fourth exciter systems AE3, AE4, respectively. With this refinement, it is possible to dispense with duplexers and power combiners. However, it would also be possible to combine the powers of the first and the second transmitting units TX1, TX2, to supply them to only a single exciter system AE3, and to dispense with the fourth exciter system AE4.

Figure 4:
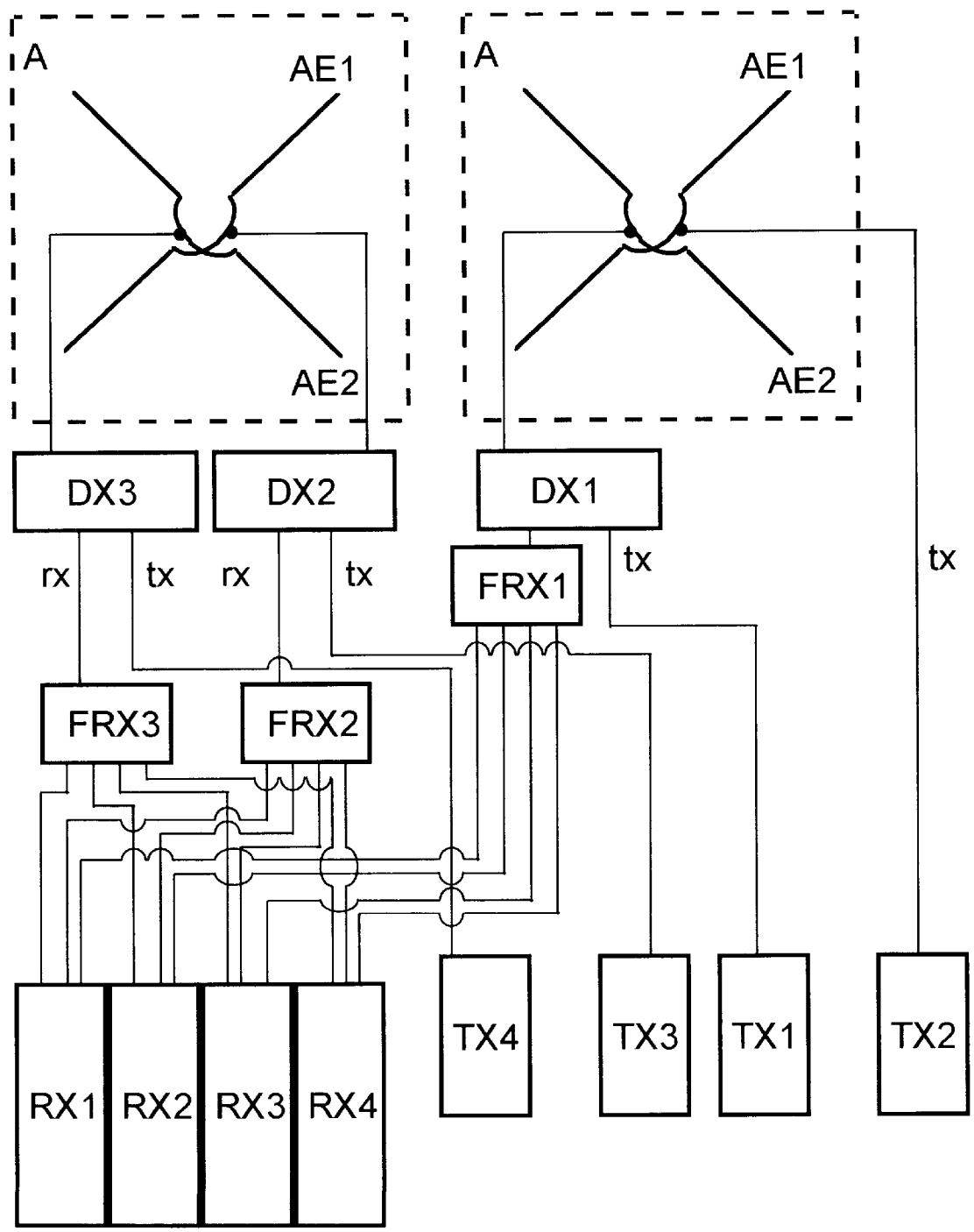
FIG. 4 illustrates a radio station having two antennas and four exciter systems, each of which is connected to a transmitting unit.

Although the space requirement for the radio station FS according to FIG. 4 is greater, the latter ensures a considerable reduction in the attenuations of the transmitted signals tx. The use of two separate antennas A, each having, for example, two cross-polarized exciter systems AE1, AE2, allows the power combiners to be dispensed with and thus makes it possible for the radio station FS to emit more power with the same output power from the transmitting units TX1, TX2, TX3 and TX4. The exciter systems AE1, AE2 for the additional antenna A are used for diversity reception so that triple diversity is also possible and for transmitting the transmitted signals tx from the two transmitting units TX1, TX2. However, the utilization of the exciter systems AE1, AE2 for the two antennas A may also be distributed in a different way, and a number of variants are possible here, in accordance with the invention, depending on the specific needs for space requirement, transmitted power or the like.

For the radio stations FS according to FIGS. 1–4, the number of antenna cables Ltg1, Ltg2 can likewise be reduced to a single cable or to a number which is smaller than that of the exciter systems AE1, AE2, AE3 and AE4, by means of duplexing.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

We claim:

1. A base station for transmitting and receiving digital information in a mobile communications system, comprising:

an antenna array for transmitting and receiving;

the antenna array having at least one first, one second and one third exciter system with at least two different polarizations having a common radio coverage area;

at least one transmitting unit;

at least one first diversity receiving unit, the at least one transmitting unit and the at least one first diversity receiving unit operating simultaneously on the first exciter system;

the first and the second exciter system connected to the first receiving unit and the third exciter system connected to at least the first receiving unit.

2. The base station according to claim 1 wherein the first and second exciter systems have a common geometric center point.

3. The base station according to claim 1 wherein the exciter systems are formed by element groups.

4. The base station according to claim 1 wherein the antenna has at least one further exciter system which is used for diversity reception.

5. The base station according to claim 1 wherein the antenna has at least one further exciter system used for transmitting.

6. The base station according to claim 1 wherein the receiving units are in each case connected to a first and a second isolating amplifier and further wherein the isolating amplifiers distribute the power of the received signals which are received by the exciter systems appropriately to the receiving units.

7. The base station according to claim 1 wherein the exciter systems are arranged in such a manner that the cross-polarization decoupling is at least 30 dB.

8. The base station according to claim 1 wherein the polarization planes of the first and of the second exciter system are inclined at 90°, or virtually 90°, with respect to one another.

9. The base station according to claim 1 wherein the polarization planes of the first and the second exciter systems are inclined at 45°, or virtually 45°, with respect to horizontal.

10. The base station according to claim 1 wherein the polarization plane of an exciter system which emits the transmitted signals is inclined at 90°, or virtually 90°, with respect to horizontal.

11. The base station according to claim 1 further comprising:

at least one duplexer connected to at least two transmitting units via a power combiner.

12. The base station according to claim 1 further comprising:

a plurality of antenna cables implemented using common physical cables.

13. The base station according to claim 1 further comprising:

a second antenna wherein at least one exciter system is used for transmission or for diversity reception.

* * * * *